(12) United States Patent
Brill

(10) Patent No.: US 7,257,565 B2
(45) Date of Patent: Aug. 14, 2007

(54) LINGUISTIC DISAMBIGUATION SYSTEM AND METHOD USING STRING-BASED PATTERN TRAINING LEARN TO RESOLVE AMBIGUITY SITES

(75) Inventor: Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/151,390

(22) Filed: Jun. 13, 2005

(65) Prior Publication Data

US 2005/0234703 A1 Oct. 20, 2005

Related U.S. Application Data

(63) Continuation of application No. 10/629,387, filed on Jul. 29, 2003, now Pat. No. 6,947,918, which is a continuation of application No. 09/539,356, filed on Mar. 31, 2000, now Pat. No. 6,684,201.

(51) Int. Cl.
G06F 17/00 (2006.01)
G06N 5/00 (2006.01)

(52) U.S. Cl. .............................. 706/45; 706/14; 706/12

(58) Field of Classification Search .................. 706/45, 706/14, 12; 704/3
See application file for complete search history.

(56) References Cited

U.S. PATENT DOCUMENTS 6,282,507 B1 * 8/2001 Horiguchi et al. ............. 704/3

OTHER PUBLICATIONS

Eric Brill, Machine Learning and Automatic Linguistic Analysis: The Next Step, 1998, IEEE, 0-7803-4428-6/98, 1033-1036.*
Eric Brill, Scaling to a Very Very Large Corpa for Natural Language Disambiguation, 2001, Microsoft.*
Chew Lim Tan et al, Text Retrieval from Document Images Based on N-Gram Algorithm, University of Sigapore, PRICAI 2000 Workshop on Text and Web Mining, 1-12.*
Jack N. Shoemaker, How Regular Expressions Really Work, 2003, ThotWave Technologies, 1-4.*
"Machine Learning and Automatic Linguistic Analysis:The Next Step", Brill, E., IEEE, 0-7803-4428-6/98, pp. 1033-1036.
"Scaling to a Very Very Large Corpa for Natural Language Disambiguation", Blanko et al., 2001, Microsoft.
"Text Retrieval from Document Images based on N-Gram Algorithm", Tan et al., University of Singapore, PRICAI 2000 Workshop on Text and Web Mining, 1-12.
"How Regular Expressions Really Work", Shoemaker, J., ThotWave Technologies, 2003, 1-4.

* cited by examiner

Primary Examiner—Joseph P Hirl
(74) Attorney, Agent, or Firm—Lee & Hayes, PLLC

(57) ABSTRACT

A linguistic disambiguation system and method creates a knowledge base by training on patterns in strings that contain ambiguity sites. The string patterns are described by a set of reduced regular expressions (RREs) or very reduced regular expressions (VRREs). The knowledge base utilizes the RREs or VRREs to resolve ambiguity based upon the strings in which the ambiguity occurs. The system is trained on a training set, such as a properly labeled corpus. Once trained, the system may then apply the knowledge base to raw input strings that contain ambiguity sites. The system uses the RRE- and VRRE-based knowledge base to disambiguate the sites.

20 Claims, 6 Drawing Sheets

LINGUISTIC DISAMBIGUATION SYSTEM AND METHOD USING STRING-BASED PATTERN TRAINING LEARN TO RESOLVE AMBIGUITY SITES

RELATED APPLICATIONS

This present application claims priority under 35 U.S.C. §120 as a continuation of U.S. Ser. No. 10/629,387, now U.S. Pat. No. 6,947,918, filed Jul. 29, 2003, which is a continuation of U.S. Ser. No. 09/539,356, now U.S. Pat. No. 6,684,201, filed Mar. 31, 2000, the disclosures of which are hereby incorporated by reference in their entirety.

TECHNICAL FIELD

This invention relates to linguistic ambiguity resolution. More particularly, this invention relates to systems and method for training linguistic disambiguators using string-based patterns.

BACKGROUND

Natural language processing systems are computer implemented software systems that intelligently derive meaning and context from natural language text. "Natural languages" are languages that are spoken by humans (e.g., English, French, Japanese). Computers cannot, without assistance, distinguish linguistic characteristics of natural language text. Natural language processing systems are employed in a wide range of products, including spell checkers, grammar checkers, machine translation systems, and speech synthesis programs.

Oftentimes, natural languages contain ambiguities that are difficult to resolve using computer automated techniques. Ambiguities come in many forms. Confusable words (e.g. then/than, its/it's, weather/whether) are one of the biggest sources of grammar errors by users. Possessive/plural types (e.g., kids/kid's) is another source for ambiguity. A third common example is part-of-speech tagging, such as differentiating whether "produce" is a noun or a verb. A fourth example is word sense disambiguation, such as deciding whether a particular instance of the word "crane" is referring to a bird or a machine.

Many natural language processing problems can be viewed as trying to disambiguate a token into one of a small number of possible labels, based upon the string context in which that token appears. For example, a spell checker may try to decide whether the word "then" or "than" is appropriate in the sentence "I am much smarter then/than you are." A machine translation system may try to determine what the word sense is of the word "line" in the sentence "I am not going to wait in line", so it can more accurately determine what the proper translation is. A speech synthesis program may try to decide whether the word "produce" is a noun or a verb in the sentence "This grocery store has beautiful produce", in order to determine the proper pronunciation for the word.

To automatically perform disambiguations, the natural language processing system is provided with linguistic knowledge that it applies to the string context in order to disambiguate. Linguistic knowledge can either be entered manually or learned automatically. Typically, the manual approach has the advantage that people can provide linguistically sophisticated knowledge. Automatic approaches are beneficial in that the linguistic knowledge can be derived empirically from essentially unlimited amounts of data, can be rapidly ported to new domains, languages, or problems, and can be constantly and automatically adapted to a particular individual or subpopulation.

To date, automatic approaches have been extremely constrained in the types of linguistic information they can learn. For example, conventional systems automatically learn how to disambiguate words/phrases by learning cues based on whether a specific word appears within a pre-specified window of words from a "disambiguation site" (i.e., the place in the text where the ambiguity to be resolved actually occurs), and what combinations of words and word features (such as part of speech) appear in immediate proximity to the disambiguation site. The contextual words and phrases surrounding the disambiguation site are commonly referred to as the "string context" or simply "string".

To provide a concrete example of a token disambiguation problem, a spell/grammar checker may wish to check whether the words "then" and "than" are confused anywhere in a document. Suppose the sentence is:

I am much bigger then you.

The spell/grammar checker will try to determine whether "then" or "than" is the correct word. It does so by analyzing the string context (e.g., the sentence in which the word appears) and applying its linguistic knowledge to this string context to determine which word is more likely. In this particular example, it may make use of its linguistic knowledge that the word "than" immediately follows a comparative adjective much more often than the word "then".

There are two primary components of a machine learning approach to the problem of token disambiguation based on a string context: (1) the algorithms used for learning and applying the learned knowledge to perform disambiguation and (2) the specification of features the learner is allowed to explore in training. Over the past decade, there have been many different approaches to (1), but very little progress in (2).

For confusable word set disambiguation, an article by Golding and Schabes, entitled "Combining Trigram-based and Feature-based Methods for Context-Sensitive Spelling Correction," *Proceedings of the 34th Annual Meeting of the Association for Computational Linguistics*, 1996, describes training a naïve Bayes classifier using as features the set of words that appear within +/−3 words of the target word and patterns of up to 2 contiguous words and/or part of speech tags around the target word. In an article by Golding and Roth, entitled "A Winnow-Based Approach to Spelling Correction," *Machine Learning*, Special issue on Machine Learning and Natural Language Processing, Volume 34, pp. 107-130, 1999, the authors propose using the Winnow machine-learning algorithm with essentially the same features. In an article by Mangu and Brill, entitled "Automatic Rule Acquisition for Spelling Correction," *Proc. of the Fourteenth International Conference on Machine Learning, ICML'97*, Nashville, Tenn., 1997, the authors describe use of transformation-based learning, again using the same features. In an article by Jones and Martin, entitled, "Contextual Spelling Correction Using Latent Semantic Analysis," Proceedings of the Fifth Conference on Applied Natural Language Processing, 1997, the authors propose use of latent semantic analysis as the learning algorithm, and features that include the set of words and contiguous word pairs (bigrams) that appear within a window of +/−7 words of the target word.

For word sense disambiguation, an article by Ng, entitled "Exemplar-Based Word Sense Disambiguation: Some Recent Improvements," Proceedings of the Second Conference on Empirical Methods in Natural Language Processing, 1997, describes systems for word sense disambiguation that employ two different machine learning algorithms, naïve Bayes and Nearest-Neighbor. In both systems, the features used were: word before, word after, word two before, word two after, the pair of words before, the pair of words after, and the two surrounding words. In an article by Yarowsky, entitled "One sense per collocation," *In Proceedings of the ARPA Human Language Technology Workshop*, 1993, the author proposes using a decision list learning algorithm with a very similar set of features.

One attempt at a richer feature set was proposed by Christer Samuellson, Pasi Tapanainen and Atro Voutilainen in "Inducing Constraint Grammars," published in Grammatical Inference: Learning Syntax from Sentences, Lecture Notes in Artificial Intelligence 1147, Springer (L. Miclet and C. del la Huguera eds), 1996. There they propose a system that can learn barrier rules for part of speech tagging. A barrier rule consists of a pair of symbols X and Y and a set of symbols S, and matches a string if that string contains X and Y, with X preceding Y and no symbols from the set S intervening between X and Y.

Despite these efforts, there remains a need for a method for learning much more expressive disambiguation cues. Such a method should be capable of being applied to virtually any problem involving token disambiguation in a string context, and should offer significant performance gains over current state of the art automatic linguistic knowledge acquisition solutions to these problems.

SUMMARY

A linguistic disambiguation system and method creates a knowledge base by training on patterns in strings that contain ambiguity sites. The system is trained on a training set, such as a properly labeled corpus. The string patterns are described by a set of reduced regular expressions (RREs) or very reduced regular expressions (VRREs), which specify features that the training system is allowed to explore in training. The resulting knowledge base utilizes the RREs or VRREs to describe strings in which an ambiguity occurs. In this way, the technique can be applied to virtually any problem involving token disambiguation in a string context.

In the described implementation, the set of reduced regular expressions (RREs) over a finite alphabet $\Sigma$ is defined as:
(1) $\forall a \in \Sigma$: "a" is a reduced regular expression and denotes a set $\{a\}$;
"a+" is a reduced regular expression and denotes a positive closure of the set $\{a\}$;
"a*" is a reduced regular expression and denotes a Kleene closure of the set $\{a\}$;
"~a" is a reduced regular expression and denotes a set $\Sigma$-a;
"~a+" is a reduced regular expression and denotes the positive closure of the set $\Sigma$-a;
"~a*" is a reduced regular expression and denotes the Kleene closure of the set $\Sigma$-a;
(2) "." is a reduced regular expression denoting a set $\Sigma$;
(3) ".+" is a reduced regular expression denoting the positive closure of the set $\Sigma$;
(4) ".*" is a reduced regular expression denoting the Kleene closure of the set $\Sigma$; and
(5) if r and s are reduced regular expressions denoting languages R and S, respectively, then "rs" is a reduced regular expression denoting a set RS.

It is noted, however, that reduced regular expressions may contain variations or extensions of the above definition.

The set of very reduced regular expressions (VRREs) over an alphabet $\Sigma$ is defined as:
(1) $\forall a \in \Sigma$: "a" is a very reduced regular expression and denotes a set $\{a\}$;
(2) "." is a very reduced regular expression denoting a set $\Sigma$;
(3) ".*" is a very reduced regular expression denoting a Kleene closure of the set $\Sigma$; and
(4) if r and s are very reduced regular expressions denoting languages R and S, respectively, then "rs" is a very reduced regular expression denoting a set RS.

The set of RREs is strictly greater than the set of VRREs. In other words, every VRRE is an RRE but not every RRE is a VRRE.

Once trained, the system may then apply the knowledge base to raw input strings that contain ambiguity sites. The system uses the RRE-based knowledge base to disambiguate the sites.

DETAILED DESCRIPTION

Figure 1:
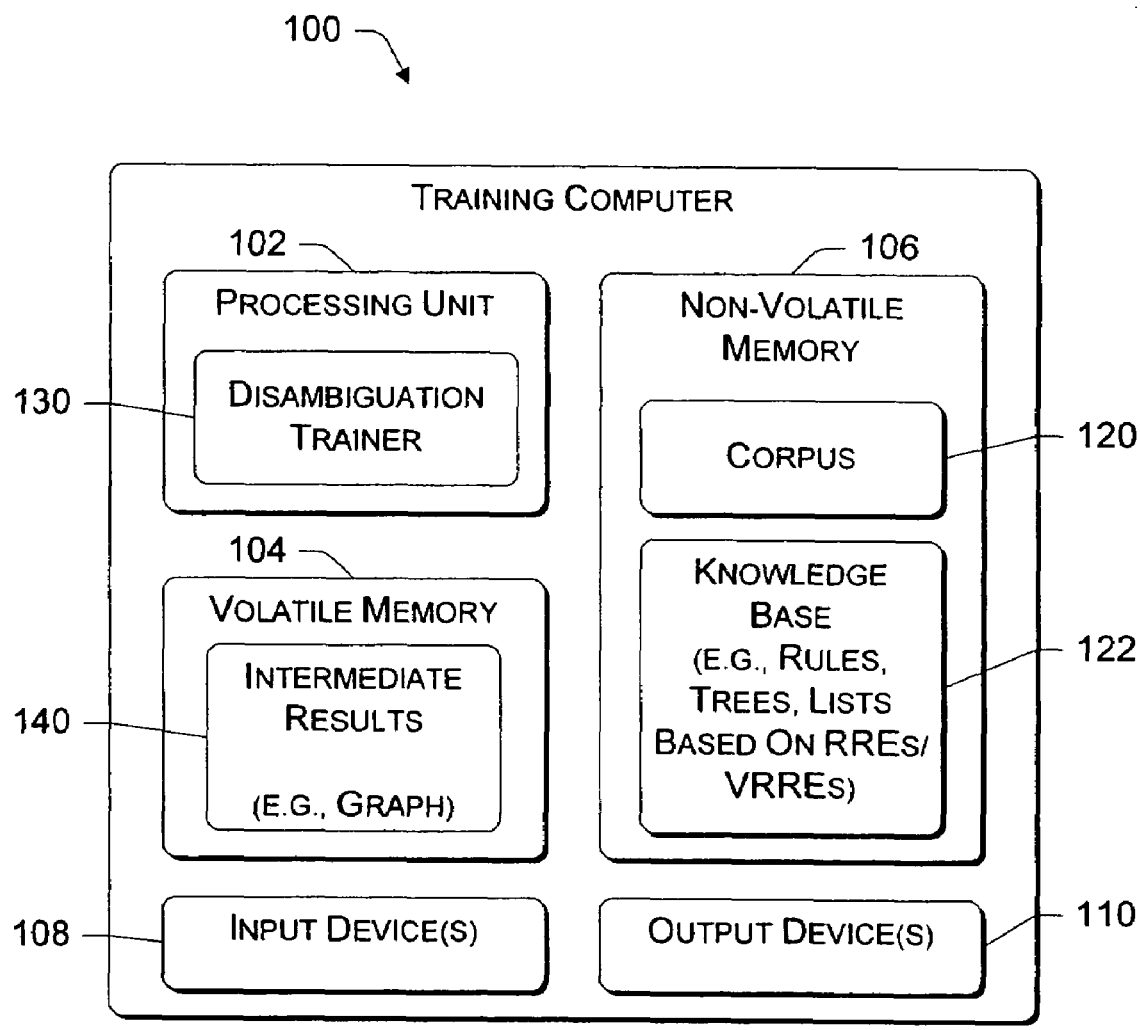
FIG. 1 is a block diagram of an exemplary training computer.

This disclosure describes linguistic disambiguation systems and methods that create a knowledge base by training on patterns in strings that contain ambiguity sites and then apply the knowledge base to raw strings to disambiguate such sites. More particularly, the system defines a set of reduced regular expressions (RREs) or very reduced regular expressions (VRREs) that describe particular patterns in the strings. The system creates the knowledge base that utilizes the RREs or VRREs to describe string patterns in which an ambiguity occurs.

Once trained, the system may then apply the knowledge base to raw input strings that may contain ambiguity sites. The system uses the knowledge base to disambiguate the sites.

Linguistic disambiguation systems may be implemented in many different environments. For example, a system may be implemented in natural language processing systems, which are employed in spell checkers, grammar checkers, machine translation systems, speech synthesis programs, and the like. The system and techniques described herein are not constrained to any particular language or alphabet, but may be applied to any string-based context, such as character strings, strings of symbols, and the like.

The following discussion is organized to first define reduced regular expressions and very reduced regular expressions that are employed by the linguistic disambiguation system. The RREs and VRREs specify the types of patterns that the training system is allowed to explore in training. Afterwards, training systems and methods for deriving a knowledge base based on the RREs and VRREs are described, followed by one exemplary implementation of a training system that employs transformation sequence learning. The discussion concludes with a description of an applier system that applies the knowledge base to disambiguate raw strings.

Reduced and Very Reduced Regular Expressions

Regular expressions are descriptions of patterns. Regular expressions are conventional and well known to those of skill in the art. Given a string S and a regular expression R, R may or may not match S. A match is defined in one of two ways: (1) either the string S contains the pattern R, or (2) the pattern R completely describes the string S. For discussion purposes, the second definition of match is used herein, unless specified otherwise. It is noted that the disambiguation learner can easily be modified to learn using either definition.

Suppose that strings are made by concatenating one or more space-delimited tokens from a set of tokens, $\Sigma$. For instance, if the strings are English words, the set of tokens $\Sigma$ is the set of words in English. A very simple regular expression is "the". Using the first definition above, this expression would match all strings having the word "the" appear anywhere within.

A set of regular expressions over a finite alphabet $\Sigma$ is defined as:

(1) $\forall a \in \Sigma$ (i.e., for all "a" in set $\Sigma$), "a" is a regular expression and denotes the set $\{a\}$; and (2) If "r" and "s" are regular expressions denoting the languages R and S, respectively, then (r|s), (rs), and (r*) are regular expressions that denote the sets R∪S, RS and R* respectively.

There are standard operations that may be used to develop more complex expressions. Standard notations and their corresponding operations are shown in Table 1.

TABLE 1

| Notation | Operation |
|---|---|
| "+" | One or more. E.g., the regular expression "(the)+" matches all strings with one or more contiguous occurrences of the word "the". |
| "*" | Zero or more. E.g., the regular expression "(the)*" matches all strings with zero or more contiguous occurrences of "the". |
| "." | A wildcard that matches any token in alphabet $\Sigma$. E.g., the regular expression "the . . . is" matches all strings with the word "the" followed by any three words followed by the word "is". The regular expression "the .* is" matches all strings with the word "the" followed by zero or more words followed by "is". |
| "~" | Not. E.g., the regular expression "~(the) is" matches any string that contains some word other than "the" immediately followed by the word "is". "the ~(is)* are" would match any string that contains the word "the" followed by zero or more words that are not "is" followed by the word "are". |
| "|" | Or. E.g., the regular expression "the (big|small) car" matches any string that contains the word "the" followed by either the word "big" or "small", followed by the word "car". |

The above definition is standard for regular expressions. One problem with regular expressions is that they are far too expressive for learning machines to automatically learn. Thus, current machine learning algorithms are not able to feasibly learn regular expression-based knowledge.

To overcome this problem, the learning machine for the linguistic disambiguation system described herein employs two less expressive languages, which will be referred to as "reduced regular expressions" (or RRE), and "very reduced regular expressions" (or VRRE). Reduced regular expressions are strictly less powerful than regular expressions, and the very reduced regular expressions are strictly less powerful than reduced regular expressions. The learning method described herein can learn any RRE and VRRE.

More particularly, the set of reduced regular expressions (RREs) over a finite alphabet $\Sigma$ is defined as:

(1) $\forall a \in \Sigma$: "a" is a reduced regular expression and denotes a set $\{a\}$;
"a+" is a reduced regular expression and denotes a positive closure of the set $\{a\}$;
"a*" is a reduced regular expression and denotes a Kleene closure of the set $\{a\}$;
"~a" is a reduced regular expression and denotes a set $\Sigma$-a;
"~a+" is a reduced regular expression and denotes the positive closure of the set $\Sigma$-a;
"~a*" is a reduced regular expression and denotes the Kleene closure of the set $\Sigma$-a;

(2) "." is a reduced regular expression denoting a set $\Sigma$;

(3) ".+" is a reduced regular expression denoting the positive closure of the set $\Sigma$;

(4) ".*" is a reduced regular expression denoting the Kleene closure of the set $\Sigma$; and (5) if r and s are reduced regular expressions denoting languages R and S, respectively, then "rs" is a reduced regular expression denoting a set RS.

The set of RREs is a proper subset of the set of regular expressions. It is noted, however, that reduced regular expressions may contain variations or extensions of the above definition. For example, one natural extension is to include classes of symbols. The above definition can be extended to include classes by letting $\Sigma'$ be the set of symbols in the alphabet and $\Sigma''$ be a set of sets of symbols from $\Sigma'$, and by letting $\Sigma$ in the definition above be the union of $\Sigma'$ and $\Sigma''$. For example, $\Sigma'$ might be the set $\{a,b,c\}$, and $\Sigma''$ might be the set of sets $\{\{a,b\},\{a,c\},\{abc\}\}$. In this case, $\Sigma$ would be the set $\{a,b,c,\{a,b\},\{a,c\},\{a,b,c\}\}$. An example of an RRE with this set extension is: a+.*$\{a,c\}$ $\{a,b\}$*, which means a sequence of one or more a's followed by zero or more characters followed by one symbol from the set $\{a,c\}$ followed by zero or more symbols from the set $\{a,b\}$. The learning algorithm presented below can easily be augmented to handle this inclusion of classes.

The set of very reduced regular expressions (VRREs) over an alphabet $\Sigma$ is defined as:

(1) $\forall a \in \Sigma$:: "a" is a very reduced regular expression and denotes a set $\{a\}$;

(2) "." is a very reduced regular expression denoting a set $\Sigma$;

(3) ".*" is a very reduced regular expression denoting a Kleene closure of the set $\Sigma$; and (4) if r and s are very reduced regular expressions denoting languages R and S, respectively, then "rs" is a very reduced regular expression denoting a set RS.

The set of RREs is strictly greater than the set of VRREs. In other words, every VRRE is an RRE but not every RRE is a VRRE. For expository purposes, the following discussion demonstrates how to learn VRREs. The generalization from learning VRREs to learning RREs is straightforward.

The RREs and VRREs describe patterns in strings. The learning machine creates a knowledge base that employs RREs and VRREs to describe virtually any given string in which a disambiguation site occurs. For example, the learning machine can learn a rule for a "then/than" disambiguation site, such as:

Add evidence for the proper word being "then" if the string matches the pattern: X followed by zero or more tokens followed by a token that is not Y followed by Z followed by one or more tokens that are not Q followed by an R where X, Y, Z, Q and R are particular words or features (e.g. parts of speech). Using expression notation from Table 1, this pattern can be expressed as:

X.*~YZ~Q+R

Since the learning machine can learn much more expressive concepts than those, learned by current state of the art techniques, it can much more precisely acquire the linguistic knowledge necessary to accurately disambiguate tokens based upon properties of the string context in which they appear.

Disambiguation Training System

FIG. 1 shows an exemplary training computer 100 that implements a linguistic disambiguation training system. The training computer 100 has a processing unit 102, volatile memory 104 (e.g., RAM), and non-volatile memory 106 (e.g., ROM, Flash, hard disk, floppy disk, CD-ROM, RAID system, etc.). The mouse, microphone, stylus, etc.) and one or more output devices 110 (e.g., monitor, LCD, speakers, etc.). The computer 100 is representative of many diverse types of computing devices, including personal computers, server computers, and the like. Although generally illustrated as a single computing system, the training computer may be implemented as multiple computers networked together.

The training computer 100 trains on a corpus 120, which is stored in non-volatile memory 106. In the string-based learning context, a corpus 120 can be viewed as an ordered set of strings. The training corpus 120 is assumed to contain strings that are truthfully and accurately presented. The corpus may be a properly labeled training set, or some other source of accurate strings (e.g., a news source).

A knowledge base 122 is created as a result of training on the corpus 120. The knowledge base 122 consists of information that utilizes RREs and VRREs to describe the strings in the training corpus, including strings that include ambiguities.

The training computer 100 has a disambiguator trainer 130 that is illustrated as executing on the processing unit 102. The diambiguator trainer 130 trains on the corpus to automatically derive the information that forms the knowledge base 122. The trainer 130 may implement different learning techniques to produce the information. Examples of possible learning techniques include transformation sequence learning, decision tree learning, decision list learning, learning with inductive logic programming, and genetic algorithm learning. A detailed implementation involving transformation sequence learning is described below in more detail.

General Learning Process

Figure 2:
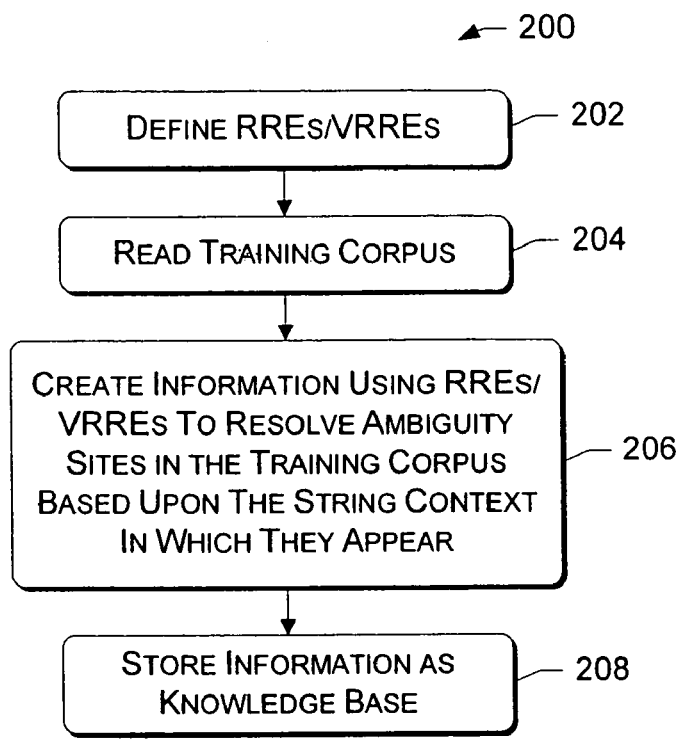
FIG. 2 is a flow diagram of a learning process implemented by the training computer of FIG. 1.

FIG. 2 shows a general learning process 200 that is implemented by the training computer 100. The process is implemented in software as computer-executable instructions that, when run on the processing unit 102, direct the training computer 100 to perform the operations illustrated in the blocks.

At block 202, the reduced regular expressions (RREs) and/or very reduced regular expressions (VRREs) are defined. The RREs and VRREs essentially specify the types of patterns that the trainer 130 is allowed to explore in training on the corpus. The defining operation may occur during initialization where the training process loads the user-defined RREs/VRREs. In the exemplary implementation, the training system utilizes the RREs/VRREs described above under the heading "Reduced and Very Reduced Regular Expressions" to establish the allowable pattern types for the trainer.

At block 204, the training computer 100 reads a training corpus 120. At block 206, the training computer 100 then creates information that uses the RREs/VRREs to properly resolve ambiguity sites in the training corpus based upon the string context in which they appear. As one example of this creation operation, the trainer 130 implements a learning machine that is augmented with the ability to learn with RREs/VRREs. The learning machine may utilize, for example, transformation sequence learning to produce a set of rules based on the RREs/VRREs, or decision tree learning to produce classification trees based on the RREs/VRREs.

At block 208, the training computer 100 accumulates and stores the information as a knowledge base 122. Once trained, the knowledge base 122 can be incorporated into products that apply the learned knowledge to resolve ambiguity sites in new strings. Application of the knowledge base to new strings is described below in more detail under the heading "Disambiguation Process".

It is noted that the training computer generates the knowledge base 122 automatically. The end result may contain errors or oversimplifications that are very difficult to catch through automated learning models. Accordingly, to cure such errors or oversimplifications, a skilled linguist may opt to read and modify the knowledge base.

Exemplary Transformation Sequence Learning

Transformation sequence learning is one example learning technique that may be implemented by the disambiguation trainer 130. The following discussion presents a detailed example of a disambiguation trainer that implements transformation sequence learning.

Transformation sequence learning attempts to find the best rule to describe a string in a training set by iteratively applying a sequence of rules, in order, to the string. An exemplary transformation-based learning machine includes:

(a) A start-state annotator, which assigns an initial label to a string.

(b) A sequence of rules of the form:

Change the label of a string from m to n if C(string)

where C is some predicate over strings.

Figure 3:
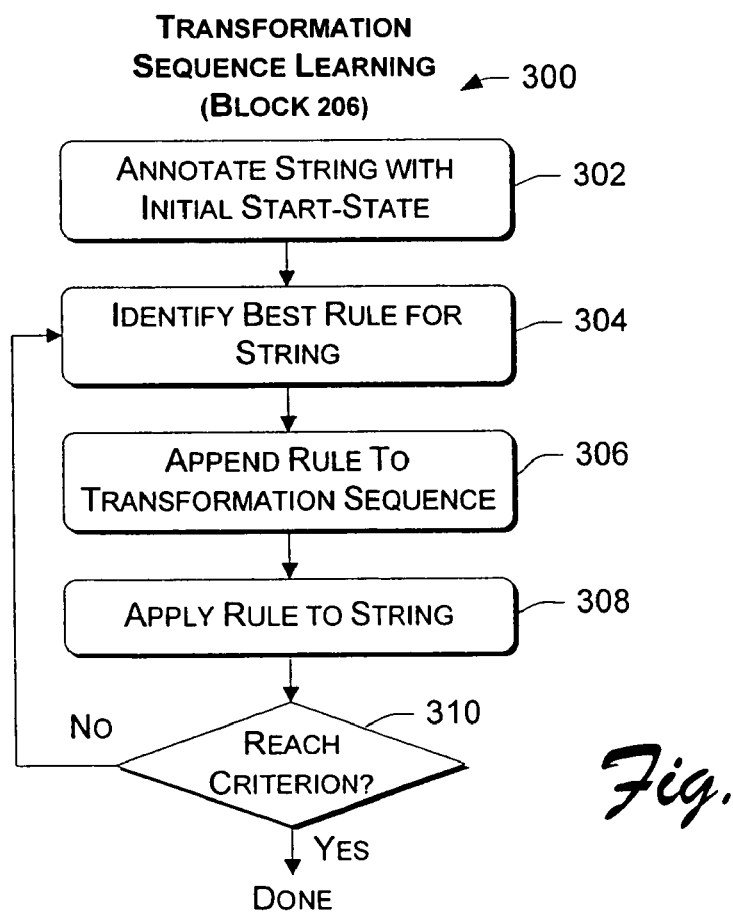
FIG. 3 is a flow diagram of a transformation sequence learning process that may be implemented as part of the FIG. 2 learning process.

FIG. 3 shows a transformation sequence learning process 300 that may be implemented by the disambiguation trainer 130 in FIG. 1. The process 300 provides one detailed implementation of block 206 from FIG. 2. The process 300 is preferably implemented in software as computer-executable instructions that, when run on the processing unit 102, direct the training computer 100 to perform the operations illustrated in the blocks.

At block 302, the disambiguation trainer 130 removes the labels from one or more strings of a properly labeled training set and applies an initial or "start-state" annotation to each string. The start-state annotation is a preliminary guess as to which label should be applied to a string. The guess may be random, or based on an analysis of the original labels on the string. The start-state annotator applies the annotation based on any computable function over strings. As one suitable example, the start-state annotator initially labels all strings with the most frequent label that appears in the training set.

At block 304, the trainer 130 identifies the "best" rule to apply to the training set. The process 300 does not depend on a particular goodness measure, but one suitable criterion for determining the "best" rule for each learning iteration will be the rule that results in the greatest improvement in accuracy when applied to the training set.

The "best" rule is appended to the end of the learned transformation sequence (block 306) and then applied to the training set (step 308). This learning iteration, represented by blocks 304, 306, and 308, is repeated until a stopping criterion is met, as represented by block 310.

To demonstrate the transformation sequence learning process 300, consider the following example of learning reduced regular expressions using a predicate C(string) in the form of: "Does RRE R apply to the string?" More particularly, the learner will learn a sequence of rules of the form:

Change the label of a string from $l_i$ to $l_j$ (for $l_i, l_j \in L$, $L=\{0, 1\}$) if the string matches reduced regular expression R.

The process is demonstrated in the context of a binary classification case (where $|L|=2$). It is noted that in binary classification, transformation lists reduce to decision lists, and rules of the form $X \rightarrow Y$ if C (i.e., transform X to Y if C) are equivalent to "Label as Y if C". However, the ongoing discussion continues in the transformation-based framework.

In this example, the "best" rule is determined in terms of good and bad label changes. The rule "$l_i \rightarrow l_j$ if C" will result in a good label change to a string if C applies to that string, the string is currently labeled as $l_i$, and the proper label for the string is $l_j$. The rule will result in a bad label change if C applies, the string is currently labeled as $l_i$, and the proper label for the string is $l_i$. The goodness of a rule is measured as the number of good label changes minus the number of bad label changes. It is noted, however, that other goodness measures may be employed.

To demonstrate the transformation sequence learning process 300, consider the training set in Table 2.

TABLE 2

Initial Training Set

| String | Label | Initial Label Guess |
|---|---|---|
| 1: a b c | 0 | 1 |
| 2: a b b | 1 | 1 |
| 3: b a a | 1 | 1 |

Since 1 is the most frequent label in the training set, the start-state annotator initially assigns all three training set strings the label 1 (i.e., block 302), as indicated by the initial label guess in Table 2. As a result, string 1 is incorrectly labeled and strings 2 and 3 are correct. After the initial annotation, the trainer iterates through operations 304-310, in each iteration learning a rule whose application will best improve our labeling of the training set.

In each learning iteration in process 300, the trainer constructs intermediate results 140 in the form of a graph containing nodes and paths between the nodes. The trainer attempts to find the "best" node in the graph and return edge labels on the path from a root node to the "best" node. These edge labels form the learned RRE or VRRE.

Figure 4:
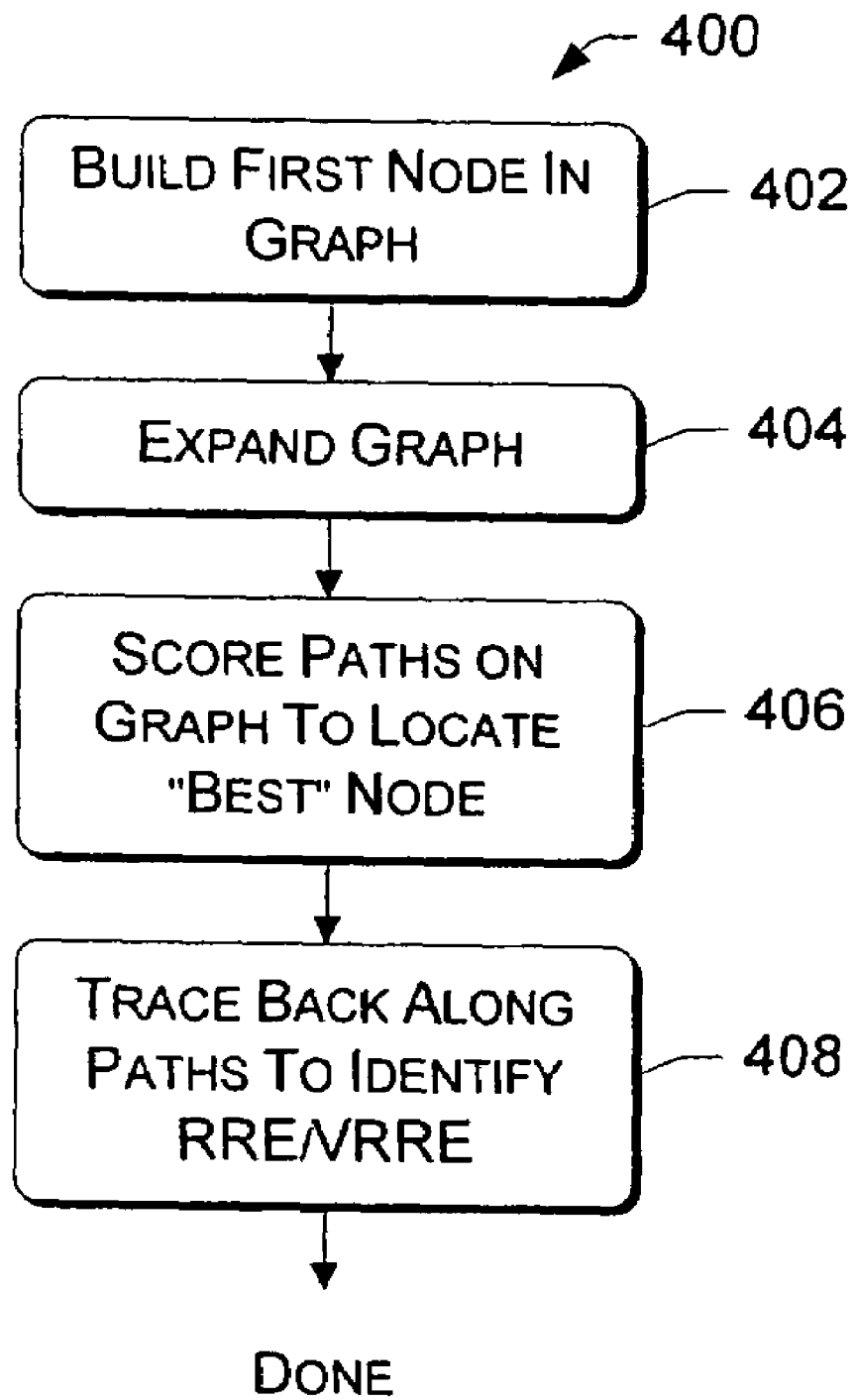
FIG. 4 is a flow diagram of a graph-construction process that is implemented as part of the FIG. 3 process.

FIG. 4 illustrates the graph construction process 400. At block 402, the trainer builds a first or root node in the graph, representing the null RRE or VRRE. Using the Table 2 training set of three strings, the root node of the graph contains a corpus position set: $\{(1,0),(2,0),(3,0)\}$. The notation "(x, y)" for a corpus position represents a string number "x", followed by a position number "y". Positions are defined as the locations just before and just after a character. For string 1 in Table 2, for example, there are four positions 0, 1, 2, and 3, as follows:

$$^0a^1b^2c^3$$

At block 404, the trainer expands the graph from the root node to secondary nodes with each unique path from root node to each secondary node representing an RRE/VRRE and storing at each node the string positions in the training corpus to which that RRE/VRRE can map. A node is expanded by considering all ways the RRE/VRRE represented by that node can be extended by appending a single atomic RRE/VRRE to the end of it, where an atomic RRE/VRRE is any RRE/VRRE that is not formed through concatenation (the concatenation operation is item (5) in the definition of RREs and item (4) in the definition of VRREs). Ideally, the graph is expanded until it is certain that an optimal RRE/VRRE for a particular training iteration is found. However, in practice, the amount or quantity of expansion is an implementation detail that may vary depending upon the corpus size and processing/memory constraints.

Figure 5:
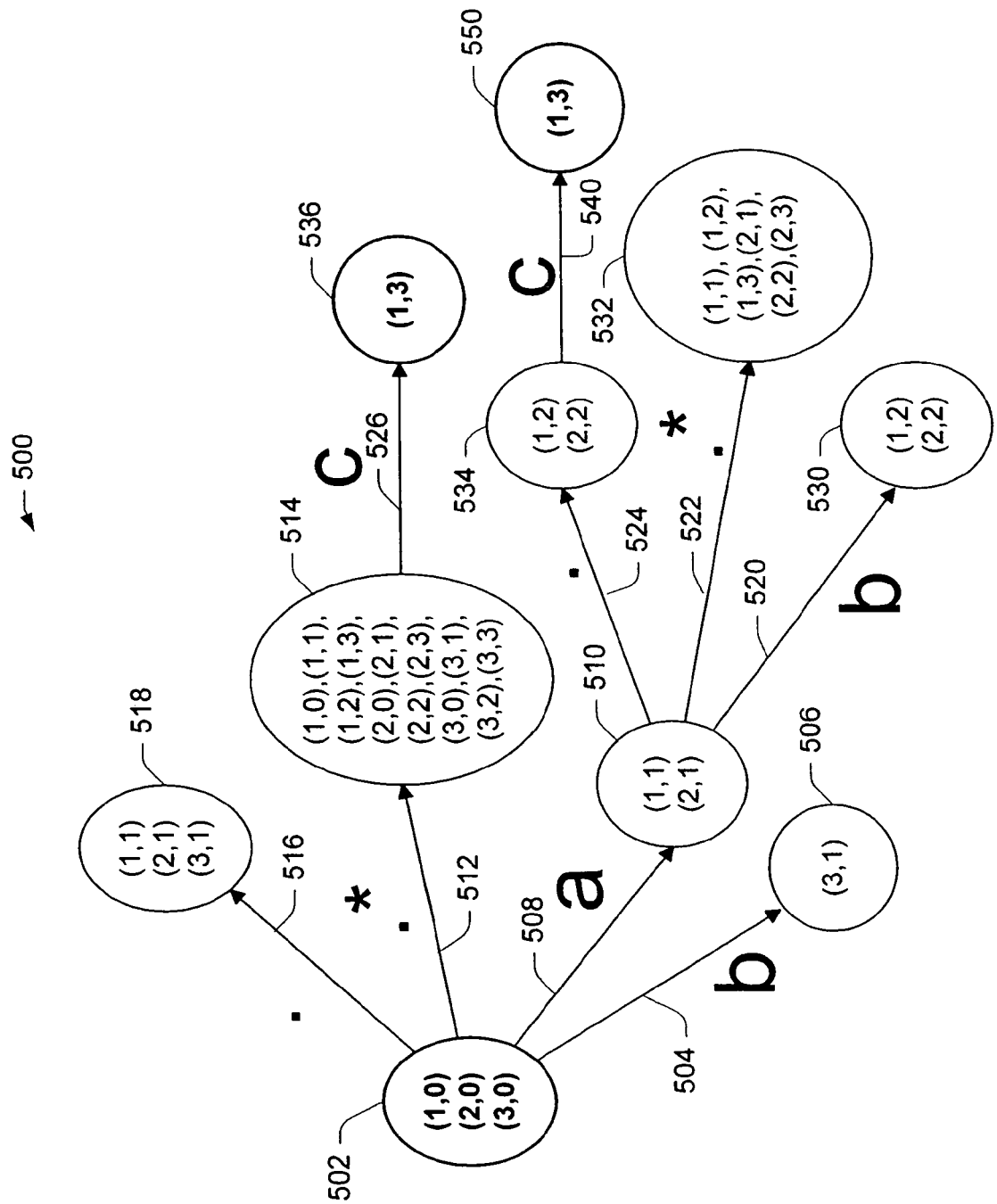
FIG. 5 is an example of a portion of a graph constructed from one iteration of the learning process.

FIG. 5 illustrates a graph 500 that contains root node 502, and paths to several secondary nodes for learning VRREs. The root node 502 contains the corpus position set $\{(1,0), (2,0),(3,0)\}$ and represents the null VRRE. The paths shown from the root node demonstrate ways of expanding the root node by appending atomic VRREs. The paths lead to secondary nodes that contain secondary position sets resulting from the expansions along associated paths.

For example, path 504 represents a case in which the letter "b" is considered as the next character after the null VRRE. Only string 3 which begins with a "b" satisfies this path, because strings 1 and 2 each begin with an "a". Accordingly, path 504 leads to a secondary node 506 that contains the position set $\{(3,1)\}$.

Path 508 represents the case in which letter "a" is considered as the next character after the null VRRE. Here, both strings 1 and 2 match this constraint, thus forming a node 508 that contains a position set $\{(1,1),(2,1)\}$.

Path 512 represents an ".*" (dot-star) operation which can consume any sequence of zero or more tokens. Path 512 leads to a node 514 that contains the position set $\{(1,0),(1, 1),(1,2),(1,3),(2,0),(2,1),(2,2),(2,3),(3,0),(3,1),(3,2),(3,3)\}$.

Path 516 represents a "." (or dot) operation, meaning that any string that matches a token in the alphabet permits movement forward one position. This path leads to a node 518 with a position set $\{(1,1),(2,1),(3,1)\}$.

Paths 504, 508, 512, and 516 are merely examples. Other paths may be made, such as one that represent "~" operations. In addition, other paths may branch from the non-root nodes to other non-root nodes, as illustrated by paths 520, 522, 524, and 526 to nodes 530, 532, 534, and 536, respectively. A path 540 from node 534 to a node 550 is also illustrated.

With reference to block 406 in FIG. 4, once the graph is properly grown, the trainer identifies the "best" node in the graph. In this example implementation, for a node state S with corpus position set P and corresponding RRE/VRRE R, the trainer computes the goodness of the rule "0→1 if R" as follows:

$$\text{Goodness\_0\_to\_1}(S) = \sum_{(j,k) \in P} \text{Score\_0\_to\_1}((j, k))$$

where Score_0_to_1((j, k)) =

$$\begin{cases} 1 & \text{if } k = |C[j]| \text{ and Guess}[j] = 0 \text{ and Truth}[j] = 1 \\ -1 & \text{if } k = |C[j]| \text{ and Guess}[j] = 0 \text{ and Truth}[j] = 0 \\ 0 & \text{otherwise} \end{cases}$$

where C[j] means the $j^{th}$ string of a corpus C. Similarly, the trainer can compute the score for rule "1→0 if R". Goodness(S) is then defined as:

Goodness(S)=max(Goodness_0_to_1(S),Goodness_1_to_0(S)).

In the FIG. 5 graph, both nodes 536 and 550 have a goodness score of 1 for the corresponding 1→0 rule. If shorter rules are preferred, the first rule in the transformation list might be "1→0 if dot* c".

At block 408, once the best node (or nodes) is identified as having the highest goodness value, the trainer traces back over the path from root node to best node to identify the RRE/VRRE corresponding to that node. Each node in the graph represents an RRE/VRRE, which is derived from the edge labels on the path from root to the node. In FIG. 5, node 536 represents the RRE/VRRE ".* c", which means all possible strings that match any tokens in the alphabet followed by the character c. Node 550 represents the RRE/VRRE "a . c", which means any string that begins with an "a" and ends with a "c".

In this case, one of the two top scoring RREs/VRREs, corresponding to nodes 536 and 550, would be added to the transformation sequence and applied to the training corpus (i.e., blocks 306 and 308). Applying the RRE/VRRE to the three strings 1, 2, and 3 in Table 2 changes the guess array with respect to string from a "1" to a "0", as represented by Table 3.

TABLE 3

Training Set After One Learning Iteration

| String | Label | New Label Guess |
|--------|-------|-----------------|
| 1: a b c | 0 | 0 |
| 2: a b b | 1 | 1 |
| 3: b a a | 1 | 1 |

In our example, after applying the rule to the training corpus, all strings A, B, and C are correctly labeled and training terminates. If the stopping criterion were not met, however, the process would apply the learned rule to change the values of the guess array, then create a new graph, find the best state in that graph, and so on.

Exemplary Pseudo Code for Process 400

The following pseudo code implements the graph building process 400 of FIG. 4. To simplify discussion, the code is directed to learning rules with VRREs. The extension to RREs is straightforward. Suppose that, given a training corpus C and for every string C[j]∈C, Truth[C[j]] ∈{0,1} is the true label of C[j] and Guess[C[j]] is the current guess as to the label of C[j]. The algorithm for one iteration of rule learning follows.

```
MAIN PROGRAM:
(1) Create a root node with corpus position set S = {(j,0) | j = 1 .. |C|) and
    push this node onto the processing stack (STACK).
(2) While (STACK not empty) {
    STATE = pop(STACK);
    Push(dotexpand(STATE),STACK);
    Push(dotstarexpand(STATE),STACK);
    ∀a ∈ Σ Push(atomexpand(a,STATE),STACK)
}
(3) Find best state S. Let R be the VRRE obtained by following the edges
    from the root to S, outputting each edge label as the edge is traversed.
    Return either the rule "0→1 if R" or "1→0 if R" depending on which is
    appropriate for state S.
dotexpand(STATE) {
    create new state STATE'
    let P be the corpus position set of STATE
    P' = {(j,k) | (j,k-1) ∈ P and k-1 ≠ |Corpus[j]|}
    If (P' not empty) {
        Make P' the corpus position set of STATE'
        Add (STATE,STATE',DOT) to tree edges (in other words,
            add an edge from STATE to STATE' labeled with DOT)
        return STATE'
    }
    Else return NULL
}
dotstarexpand(STATE) {
    create new state STATE'
    let P be the corpus position set of STATE
    P' = {(j,k) | (j,m) ∈ P, m≦ k, and k ≦ |Corpus[j]|}
    If (P' ≠ P) {
        Make P' the corpus position set of STATE'
        Add (STATE,STATE',DOT*) to tree edges
        return STATE'
    }
    Else return NULL
}
atomexpand(a,STATE) {
    create new state STATE'
    let P be the corpus position set of STATE
    P' = {(j,k) | (j,k-1) ∈ P, k-1 ≠ |Corpus[j]|, and the k-1st
        symbol in Corpus[j] is a}
    If (P' not empty) {
        Make P' the corpus position set of STATE'
        Add (STATE,STATE',a) to tree edges
        return STATE'
    }
    Else return NULL
}
```

The algorithm above is exponential. There are some optimizations that make it feasible to apply the learning algorithm.

Optimization 1: Prune states that cannot be on the path from root to the best state. Define GoodPotential_0_to_1(S) as the number of strings s in the training corpus for which Guess[s]=0, Truth[s]=1 and ∃k: (s, k) ∈ corpus_position_set(S). GoodPotential_1_to_0(S) can be similarly defined. Then, GoodPotential(S) is defined as:

GoodPotential(S)=max(GoodPotential_0_to_1(S), GoodPotential_1_to_0(S)).

As the graph is constructed, the trainer keeps track of the largest Goodness(S) encountered. If that value is X, then for a state S', if GoodPotential(S')≦X, it is impossible for any path through S' to reach a state with a better goodness score than the best found thus far. This condition is checked when pushing states onto the stack and popping states off the stack to be processed. If the pruning condition is met, the state is discarded.

Optimization 2: Merge states with identical corpus position sets. If a state being pushed onto the stack is already represented by another state with an identical corpus position set, the state need not be pushed onto the stack.

Heuristics are employed to decide which of the states with identical corpus position sets we should keep, such as choosing the state with the shortest path to the root.

Optimization 3: Prune a state subsumed by another state. If a state S is being pushed onto the stack that already contains a state with a superset of all of the good positions and a subset of all the bad positions of S, then state S need not be processed.

Linguistic Disambiguation System

Figure 6:
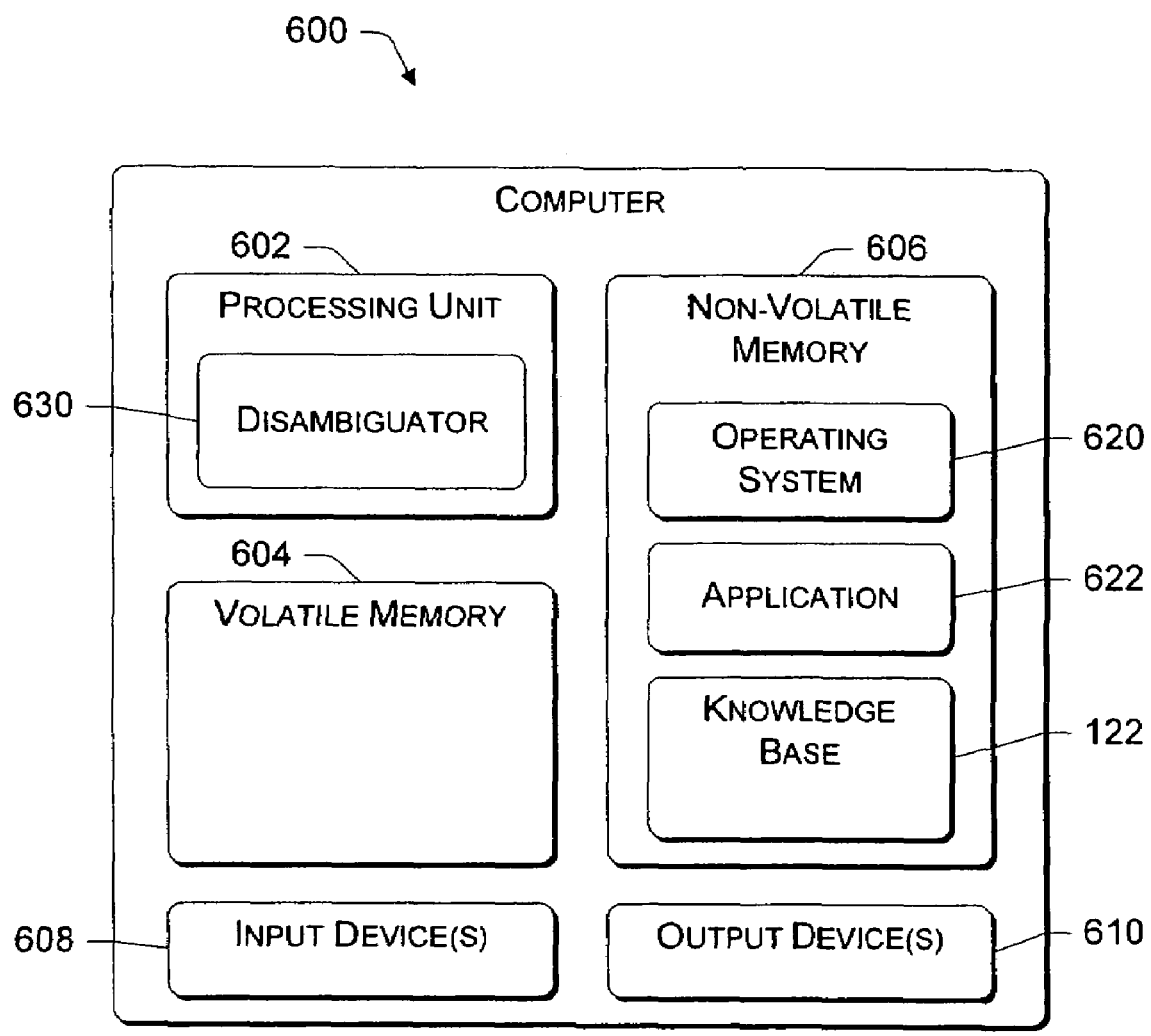
FIG. 6 is a block diagram of an exemplary computer that implements a trained disambiguation system.

FIG. 6 shows an exemplary computer 600 that implements a linguistic disambiguation system. The computer 600 has a processing unit 602, volatile memory 604 (e.g., RAM), and non-volatile memory 606 (e.g., ROM, Flash, hard disk, floppy disk, CD-ROM, RAID system, etc.). The computer 600 also has one or more input devices 608 (e.g., keyboard, mouse, microphone, stylus, etc.) and one or more output devices 610 (e.g., monitor, LCD, speakers, etc.). The computer 100 is representative of many diverse types of computing devices, including personal computers, set-top boxes, game consoles, portable computing devices, and the like.

The computer 600 runs an operating system 620 and an application program 622 that utilizes a natural language processing system. Examples of such application programs include word processors with spell/grammar checkers, speech synthesis programs, and the like. For purposes of illustration, operating system 620 and program 622 are illustrated as discrete blocks stored in the non-volatile memory 606, although it is recognized that such programs and components reside at various times in different storage components of the computer 600 and are executed by the processor 602. Generally, these software components are stored in non-volatile memory 606 and from there, are loaded at least partially into the volatile main memory 604 for execution on the processor 602.

The knowledge base 122 created by the training computer 100 (FIG. 1) is stored in the non-volatile memory 606. The knowledge base 122 contains information that utilizes RREs/VRREs to resolve ambiguity based upon the strings in which the ambiguity occurs.

During execution of the application program 622, the processing unit 602 executes a disambiguator 630 that receives a string that contains an ambiguity site. In the context of word processing, the string may have been entered by the user during operation of the program 622. Alternatively, the string may have been read from memory or received from some external source. The disambiguator 630 uses the RREs/VRREs in the knowledge base 122 to resolve the ambiguity site.

Disambiguation Process

Figure 7:
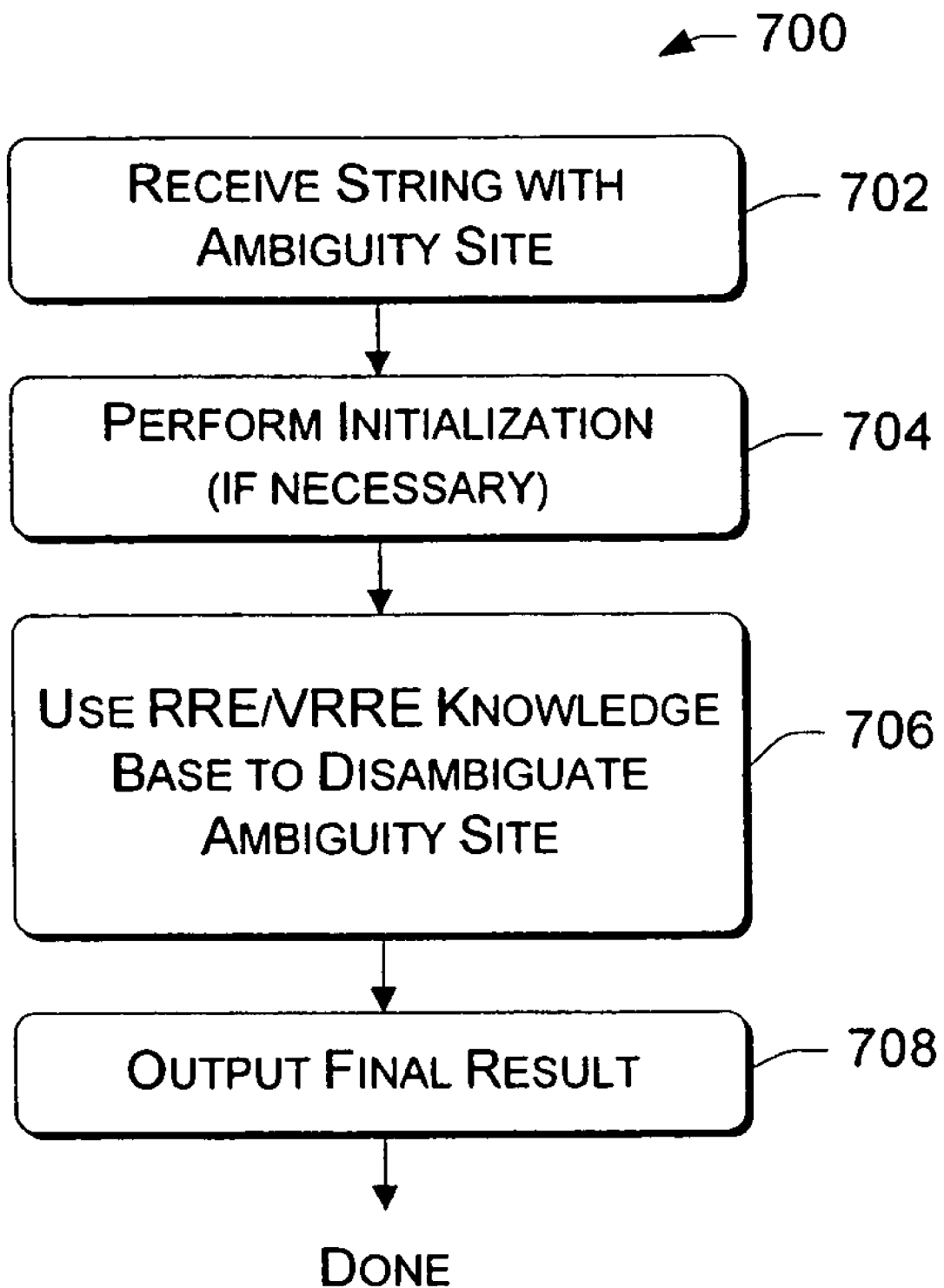
FIG. 7 is a flow diagram of a disambiguation process implemented by the FIG. 6 computer to resolve ambiguity sites in input strings.

FIG. 7 illustrates a disambiguation process 700 that is implemented by the disambiguator 630 of FIG. 6. The process 700 is preferably implemented in software as computer-executable instructions that, when run on the processing unit 602, direct the computer 600 to perform the operations illustrated in the blocks.

At block 702, the disambiguator 630 receives a string with an ambiguity site. The disambiguator 630 initializes the string if necessary (block 704). In the context of transformation sequence learning, the disambiguator 630 annotates the string with a start-state. The disambiguator then uses the RRE/VRRE knowledge base to disambiguate the ambiguity site in the string (block 706). For transformation sequence learning, the disambiguator applies each RRE/VRRE in knowledge base in sequence to the annotated string. At block 708, the disambiguator outputs the final result.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

I claim:

1. A computer-implemented method comprising:
   defining a set of reduced regular expressions for particular patterns in strings, wherein the set of reduced regular expressions has less expressiveness than a set of regular expressions;
   learning, from a training set, a knowledge base that uses the reduced regular expressions to resolve ambiguity based upon the strings in which the ambiguity occurs, wherein the learning includes transformation sequence learning to create a set of rules that use the reduced regular expressions to resolve ambiguity based upon the strings in which the ambiguity occurs; and
   applying the knowledge base to resolve at least one ambiguity site in one or more raw strings.

2. A computer-implemented method as recited in claim 1, wherein the set of reduced regular expressions are defined over a finite alphabet $\Sigma$, wherein the alphabet is a union of multiple sets of distinct classes.

3. A computer-implemented method as recited in claim 1, wherein the training set comprises a labeled corpus.

4. A computer-implemented method as recited in claim 1, wherein the set of reduced regular expressions specify types of patterns that are allowed to be explored when learning from the training set.

5. A computer-implemented method as recited in claim 1, wherein the learning includes applying a set of very reduced regular expressions that are a proper subset of the reduced regular expressions.

6. A computer readable medium having computer-executable instructions that, when executed on a processor, perform a method comprising:
   defining a set of reduced regular expressions for particular patterns in strings wherein the set of reduced regular expressions has less expressiveness than a set of regular expressions;
   learning, from a training set, a knowledge base that uses the reduced regular expressions to resolve ambiguity based upon the strings in which the ambiguity occurs, wherein the set of reduced regular expressions specify types of patterns that are allowed to be explored when learning from the training set; and
   applying the knowledge base to resolve one or more ambiguity sites in at least one string different than any string in the training set.

7. A computer readable medium as recited in claim 6, wherein the set of reduced regular expressions are defined over a finite alphabet $\Sigma$, wherein the alphabet is a union of multiple sets of distinct classes.

8. A computer-implemented method as recited in claim 6, wherein the training set comprises a labeled corpus.

9. A computer-implemented method as recited in claim 6, wherein the learning comprises transformation sequence learning to create a set of rules that use the reduced regular expressions to resolve ambiguity based upon the strings in which the ambiguity occurs.

10. A computer-implemented method as recited in claim 6, wherein the learning includes applying a set of very reduced regular expressions that are a proper subset of the reduced regular expressions.

11. A computer-implemented method comprising:
receiving a raw string with an ambiguity site;
applying reduced regular expressions to describe a pattern in the raw string, wherein the reduced regular expressions:
are included in a knowledge base that is learned from a training set;
have less expressiveness than regular expressions; and
specify types of patterns that are allowed to be explored when the knowledge base is learned; and
selecting one of the reduced regular expressions to resolve the ambiguity site, wherein the raw string is different from any string in the training set.

12. A computer-implemented method as recited in claim 11, wherein the applying includes applying a set of very reduced regular expressions that are a proper subset of the reduced regular expressions.

13. A computer-implemented method comprising:
receiving a raw string with an ambiguity site;
applying reduced regular expressions to describe a pattern in the raw string, wherein:
the applying includes applying a set of very reduced regular expressions that are a proper subset of the reduced regular expressions; and
the reduced regular expressions have less expressiveness than regular expressions; and
selecting one of the reduced regular expressions to resolve the ambiguity site of the raw string.

14. A computer readable medium having computer-executable instructions that, when executed on a processor, perform a method comprising:
receiving a raw string with an ambiguity site;
applying reduced regular expressions to describe a pattern in the raw string, wherein the reduced regular expressions:
are included in a knowledge base that is learned from a training set;
have less expressiveness than regular expressions; and
specify types of patterns that are allowed to be explored when the knowledge base is learned; and
selecting one of the reduced regular expressions to resolve the ambiguity site, wherein the raw string is different from any string in the training set.

15. A computer readable medium as recited in claim 14, wherein the applying includes applying a set of very reduced regular expressions that are a proper subset of the reduced regular expressions.

16. A computer readable medium having computer-executable instructions that, when executed, direct a computer to:
read a training set;
construct a graph having a root node that contains a primary position set of the training set and multiple paths from the root node to secondary nodes that represents a reduced regular expression that has less expressiveness than a regular expression, the secondary node containing a secondary position set to which the reduced regular expression maps;
score the secondary nodes to identify a particular secondary node; and
identify the reduced regular expression that maps the path from the root node to the particular secondary node, wherein the reduced regular expression is applicable resolve an ambiguity site within a raw string, the raw string being different than any string in the training set.

17. A training system comprising:
a memory to store a training set;
a processing unit; and
a disambiguation trainer, executable on the processing unit, to define a set of reduced regular expressions for particular patterns in strings of the training set and learn a knowledge base that uses the reduced regular expressions to describe the strings wherein the reduced regular expressions specify types of patterns that are allowed to be explored when the knowledge base is learned from the training set and have less expressiveness than a set of regular expressions; wherein:
the knowledge base is applicable to disambiguate a raw string including an ambiguity site; and
the raw string is different than any string in the training set.

18. A training system as recited in claim 17, wherein the training set comprises a labeled corpus.

19. A training system as recited in claim 17, wherein the disambiguator trainer employs transformation sequence learning to create a set of rules that use the reduced regular expressions to describe the strings.

20. A system comprising:
a memory to store a knowledge base that uses reduced regular expressions that have less expressiveness than regular expressions to resolve ambiguity based upon strings in which the ambiguity occurs, wherein the knowledge base is learned from a training set using the reduced regular expressions, the reduced regular expressions specify types of patterns that are allowed to be explored when the knowledge base is learned;
a processing unit; and
a disambiguator, executable on the processing unit, to receive a raw string with an ambiguity site and apply a reduced regular expression from the knowledge base that describes a pattern in the raw string to resolve the ambiguity site, wherein the raw string is different than any string in the training set.

* * * * *